Aug. 20, 1963   S. T. MARTIN   3,100,984
VAPOR FRACTION ANALYZER
Filed Sept. 28, 1959   2 Sheets-Sheet 1
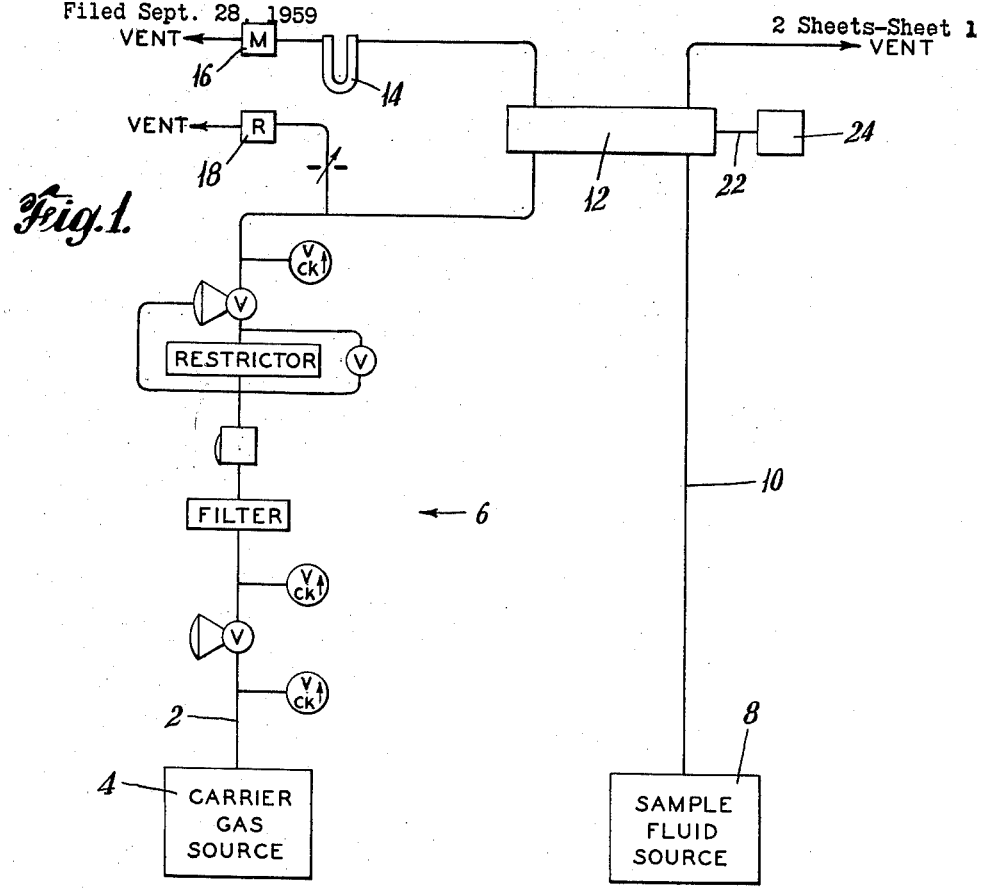
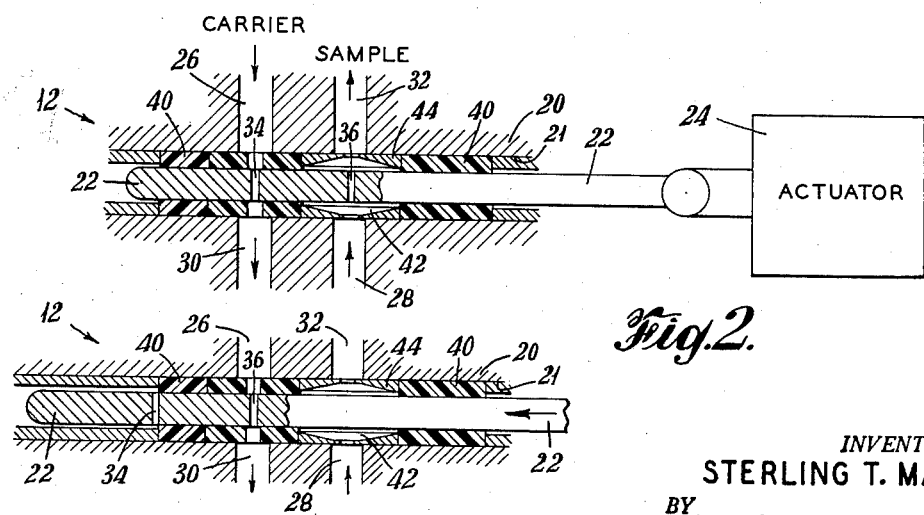
INVENTOR.
STERLING T. MARTIN
BY
ATTORNEY

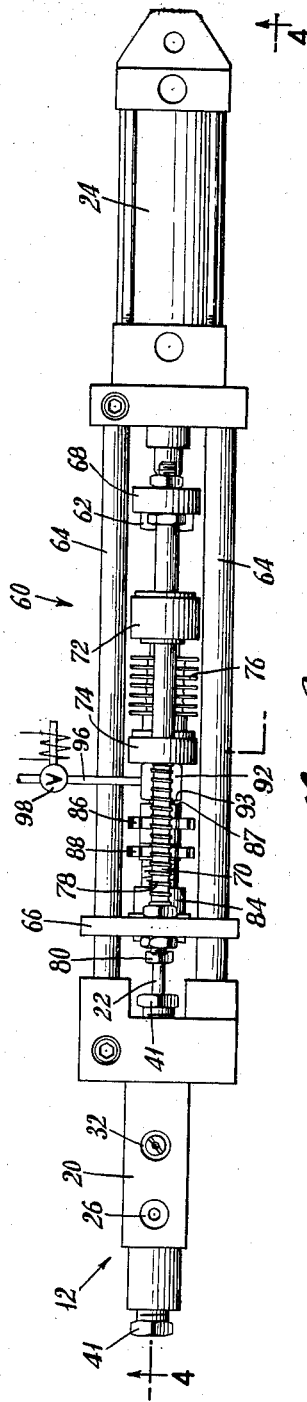
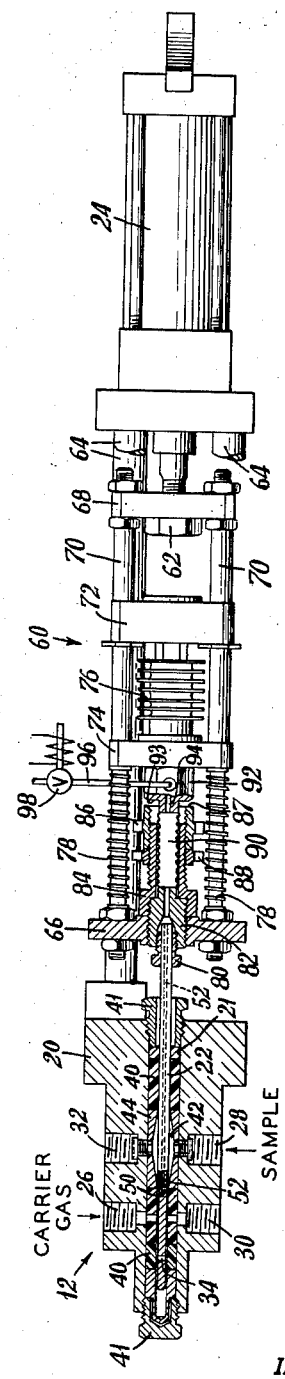
Fig. 3.
Fig. 4.
INVENTOR.
STERLING T. MARTIN
BY
ATTORNEY

3,100,984
VAPOR FRACTION ANALYZER
Sterling T. Martin, Charleston, W. Va., assignor to Union Carbide Corporation, a corporation of New York
Filed Sept. 28, 1959, Ser. No. 842,921
9 Claims. (Cl. 73—23)

This invention relates to an improved vapor fraction analyzer and more particularly to a vapor fraction analyzer capable of unusual accuracy and reproducibility especially when used with liquid flow systems.

Heretofore, many types of vapor fraction analyzers have been proposed to effect measurements based on vapor phase chromatography principles. As set forth in an article entitled "Application of the Vapor Phase Chromatography in the Gas Analytical Field" by F. Van de Craats, Analytica Chimica Acta, vol. 14, 1956, pages 136 to 149. Analyses of multi-component vapor samples may be effected by a variety of procedures including the gas-liquid partition and adsorption-displacement methods of vapor phase chromatography. In a typical gas-liquid partition method, a carrier gas, such as helium, continuously flows at a continuous rate through a reference cell, which responds to the thermal properties of the gas, and from thence to a sample injection point into which the sample of liquid or gas to be analyzed is introduced. Thus the mixture of carrier gas and sample flows into the partition type of separating column which is packed with an inert support coated with a high boiling point organic liquid. Since all components of the multi-component sample vary in partition co-efficients and the time they are retained on the column materials, each component of a mixture will travel through the column at a different speed to form the basis for resolution of the multi-component sample into its components. As each component elutes separately from the column mixed with the carrier gas as a binary mixture, it is passed to a second cell for measuring the thermal properties of each separate binary mixture. The reference and measuring cells with associated circuitry comprise the detector system, where a change in the composition (i.e. carrier gas plus sample component) causes an unbalance between the reference and measuring cells which is recorded. In this manner a series of peaks deviating in magnitude from a reference zero signal established by the helium carrier gas passing through the reference cell permits quantitative measurement of the components of the multi-component sample.

It is important to provide means in the analyzer for accomplishing the complete resolution or separation of the components of the vapor sample. In order to impart to the analyzer the greatest possible resolving power, it is necessary to provide: (1) that the sample enters the column with a minimum of dilution caused by diffusion with the carrier gas; (2) that the effluent binaries (carrier gas plus a component of a multi-component vapor sample) enter the measuring cell with a minimum of interposed volume so that successive binaries will neither overlap or excessively diffuse before entering and result in destroying resolution; and (3) that to insure a stable condition of measurement for the reference and measuring cells, both of these cells must be essentially insensible to pressure, for example the density of the carrier gas and the reference cell must be maintained essentially constant and that the gas in both cells must be maintained at essentially constant absolute pressures.

In addition, it is important to provide a maximum magnitude of output signal for each component of the sample vapor, and to provide that the continuous analysis of identical sample vapors produces an identical magnitude and output signal. It has been found that in order to insure that this condition is obtained, the flow of carrier gas must be maintained constant and at an optimum value. Should the carrier gas flow be very slight, the sample will diffuse throughout the system, resulting in a loss in resolution and in magnitude of the differential output signal. On the other hand, if the rate of flow of carrier gas is excessive, the component peaks move toward each other and reduce in magnitude so that again both resolution and output signal strength suffer. Further, it is important that for repetitive analyses of the same sample composition the time of transit of and the magnitude of a given binary through the measuring cell must always be the same for repetitive recordings. Still further, the volume of each successive multi-component sample to be analyzed must be identical. This is especially important in liquid systems where, when the liquid is vaporized in the analyzer, slight variations in the liquid volume cause very large variations in the resultant gaseous volume. Since the measurement is proportional to the difference between the thermal characteristics i.e., the combined thermal conductivity and heat capacity characteristics of the carrier gas and those of the effluent binary mixtures (sometimes include the exothermic heat of combustion), it is necessary to maintain the reference cell, the measuring cell, the carrier gas, the fixed volume, the multi-component sample vapor, and the separating column at the same substantially constant value of ambient temperature.

As stated previously, the problem of obtaining extremely accurate and reproducible volumes of a liquid sample to be carried into the analyzer is very important. The problem of developing an apparatus capable of sufficiently accurate sampling has been facing the chemical instrumentation industry for years. The problem becomes more pronounced when the volumes of liquid to be accurately sampled are in the order of fractional cubic centimeters. Also, it is desirable that this volume be changed with relative ease and simplicity for different multi-component systems where it is desired to change the sensitivity for a given component.

Previous equipment available to the industry has utilized some sort of calibrated chamber which is first filled with the sample and then swept into the analyzer by means of a carrier gas. However, such systems have always been somewhat unsatisfactory due to the amount of valving necessary to first fill the chamber and then empty it while at the same time maintaining both sample and carrier flow. The number of valves and conduits necessary with such a system has resulted in unsatisfactory sampling accuracy due to leaks, poor sample purging between sampling etc. These variations in sample volumes result in the false readings by the analyzer which would seem to indicate a quantitative variation in the multi-component system, but which are really the result of varying sample volumes.

It is accordingly the primary object of the present invention to provide a vapor fraction analyzer capable of very accurate and reproducible measurements.

It is a further object to provide such a device capable of sampling and injecting into the analyzer extremely precise volumes of a liquid multi-component sample.

It is a further object to provide such a device which substantially eliminates contamination of the sample by either the atmosphere or by previous sample.

It is a still further object to provide such a sampling system wherein the volume of sample injected may be easily and accurately changed. Other objects and advantages will be apparent from the description and drawings in which:

FIG. 1 represents a schematic diagram of the flow system of the instant vapor fraction analyzer.

FIG. 2 is a cross-sectional view of one embodiment of the apparatus capable of measuring extremely small and accurate volumes of a sample fluid and transporting same to the carrier gas stream shown in its sampling position.

FIG. 2a is a cross section of the apparatus of FIG. 2 shown in the transport position wherein the carrier gas is able to sweep the sample into the analyzer.

FIG. 3 is a plan view of a preferred form of the sample measuring and injecting apparatus and FIG. 4 is a view partially in cross section taken along lines 4—4 of the apparatus of FIG. 3.

The objects of the invention are accomplished in general by a vapor fraction analyzer comprising a separating column having inlet and outlet means, carrier gas passage means, and multi-component sample fluid passage means, means for accurately regulating the pressure and flow of the carrier gas through the passage means and the separating column, a measuring cell connected to the output of the separating column for developing an output signal proportional to the thermal characteristics of successive binary gas mixtures coming from said column, a reference cell connected to the carrier gas passage means parallel to the separating column for constantly developing an output signal proportional to the thermal characteristics of the carrier gas, electrical circuit means connected to both the measuring cell and the reference cell for comparing the output signals from said cells and developing an output signal proportional to the difference between the said signals, sampling means interposed between the carrier gas passage means and the multi-component fluid sample passage means for physically transporting a precise volume of fluid from the latter passage to the former passage and further means for injecting said volume of sample fluid into the carrier gas passage adjacent the inlet of the separating column.

By means of the present invention a desired volume of a sample fluid may be physically transported or carried into the carrier gas stream which in turn carries the sample into the separating column of the analyzer. It has further been found that the volume of sample may be reproduced within extremely narrow tolerances on successive samplings. As stated previously, for the satisfactory monitoring of a plant stream this reproducibility of successive samplings is of utmost importance for accurate measurements by the analyzer.

An additional feature of the invention is the provision of means for varying the volume of sample the device meters out in successive cycles. Venting means are also provided so that a completely new sample is injected into the analyzer in each cycle thus reducing time lag to a minimum.

The device will now be described with reference to the drawings in which FIG. 1 represents a flow diagram wherein the device of the instant invention is shown in combination with a chromatographic analyzer having a carrier gas source and a fluid sample source. The carrier gas such as helium flows through conduit 2 from an appropriate source 4. Means designated generally by the numeral 6 are provided for filtering and carefully regulating the flow of the carrier gas and comprise conventional pressure regulators, filters, gages, restrictors and the like. Careful regulation of the carrier gas flow is quite critical as stated previously since too rapid a flow will cause the binary components to elutriate too rapidly thereby loosing definition or separation and too slow a gas flow will cause the binary components to diffuse within the column with substantially the same results. Variations in the flow rate will cause spurious detector system output signals since the measuring cells are programmed to take readings at specific times during the sampling cycle when it is known that a certain component is coming off.

A sample fluid source 8, usually a connection with a point in a flow system it is desired to monitor, supplies a flowing sample stream thru conduit 10 to the sampling station 12. At this point, according to the invention, means are provided for transporting a desired volume of sample fluid from the sample stream 10 to the carrier gas stream 2 and injecting same therein wherein the carrier gas moves the sample into the separating column 14 where it is separated into its various binary components and then passed through the measuring cell 16 where the thermal characteristics of each binary component are measured and compared with the thermal characteristics of the carrier gas alone which are constantly measured by the reference cell 18 connected to the carrier gas conduit 2 prior to the point where the sample is introduced.

The most basic form of the transporting and injecting apparatus comprises a body member 20 having a bore 21 therein, an elongated rod or piston 22, axially slideable therein and means 24 for axially moving piston 22 a desired distance within the body member 20. Referring now to FIGS. 2 and 2a where the details of this embodiment are more clearly shown, inlet means 26, 28 and outlet means 30, 32 are provided for the carrier gas and sample fluid respectively at two points displaced along the body member 20. Each pair of inlet and outlet means 26, 30 and 28, 32 are located diametrically opposite each other in the tube wall. In this embodiment drilled passageways 34, 36 are provided in the solid piston 22 the same distance apart as are the pairs of inlet and outlet passages 26, 30 and 28, 32. Thus when the piston is in the sampling position shown in FIG. 2 the carrier gas flows through inlet means 26, passage 34 and outlet 30 and the sample flows through inlet 28, passage 36 and outlet 32. The actuator 24 is adapted to selectively position the piston 22 in either that shown in FIG. 2 or that of FIG. 2a. The actuator 24 is preferably a pneumatic cylinder.

When it is desired to transport a volume of the sample to the carrier gas line and cause same to be moved into the separating column the actuator 24 is energized causing the piston 22 to be moved to the position shown in FIG. 2a. The volume of sample presently in the passageway is very effectively sheared off by the action of the sealing members 40 which are constructed of suitable materials as plastic or leather. Thus the precise volume of the passage 36 is the volume of sample transported to the carrier gas stream which in turn flows through the passage 36 carrying the sample to the separating column. Repeated experiments have shown that very reproducible results are obtained with this arrangement due to the precise metering achieved by moving the passage 36 filled with the sample from the sample to the carrier gas stream.

In order to insure constant sample flow so that the process stream is constantly being monitored a V-shaped groove 42 is provided around the piston 22 to maintain a constant sample flow path from inlet 28 to outlet 32 regardless of the position of 22 and passage 36. In the present embodiment a sleeve insert 44 having such a groove and openings at the bottom thereof which line up with inlet 28 and outlet 32 is placed in the body member 20 and is held in place by packing members 40 all of said members 40 and 44 being of substantially the same thickness. Thus the sample can flow through the body member 20 when the piston 22 is in the injecting position of FIG. 2a.

A more refined embodiment of the invention is shown in FIGS. 3 and 4 wherein means are provided for positively forcing or injecting the sample fluid into the carrier gas stream. Further means are provided for varying the volume of sample which can be injected into the analyzing equipment while still maintaining the metering accuracy or reproducibility of successive measurements on a given volume setting.

This latter feature is extremely important for plant installations where the ranges of components being measured varies considerably from day to day and it is desirable to vary the total volume of the sample to maintain a measurable quantity of a given component.

In this embodiment the transporting system 12 is virtually the same as that described with respect to FIGS. 2 and 2a and like reference figures have been used to denote like parts. A body member 20 with a bore 21 therein is provided having inlet and outlet means 26, 30 and 28, 32 for the carrier gas and sample fluid respectively. Packing and sealing members 40 and member 44 which has the V-shaped annular groove 42 on its interior are held in bore 21 by retaining nuts 41. Piston member 22 has the crosswise bore 34 therein for passing carrier gas when the piston is in the sampling position. The difference in this embodiment resides in the sampling chamber per se. Instead of the fixed sample chamber formed by crosswise bore 36 in the piston 22 an opening 50 enters one side of the piston on the inlet side of the sample stream and connects with an axial passage 52 extending from the junction point out through the end of the piston 22 and connects with a variable volume chamber whose function will be described later. The piston 22 is again positionable in either a sampling position as exemplified in FIG. 2 previously or an injecting position as exemplified by FIG. 2a by actuating means 24 which again is preferably a pneumatic cylinder. However in this embodiment the piston is fixedly connected to a variable volume apparatus designated generally by the numeral 60. This entire apparatus is moved or transported along with piston 22 from the sampling position to the injecting position and back again by the actuating means 24, connected at 62 to the piston of the pneumatic cylinder 24. Apparatus 60 moves along guide rods 64 which are engaged by member 66 at the opposite end of apparatus 60 from the actuating cylinder 24.

The variable volume apparatus 60 comprises a frame comprised of member 66 at one end thereof and a member 68 at the other end thereof connected to the piston of the actuating means 24 at 62. These two members 66 and 68 are rigidly connected together by a second pair of guide rods 70. A member 72 is fixedly attached to the guide rods 70 adjacent fixed member 68. A member 74 is slidably mounted on guide rods 70 between the fixed member 72 and fixed member 66. A second actuating means 76 is connected at one end to fixed member 72 and at the other end to slidable member 74. This means is preferably a pneumatically operated bellows which when air pressure is applied forces slidable member 74 toward fixed member 66. Springs 78 are provided on guide rods 70 for returning member 74 to its original positon when air pressure is released on the actuating bellows 76.

The end of the piston 22 having bore 52 therein is fixedly connected to member 66 by threaded members 80 and 82, the latter member having a passage through the center thereof connecting with the bore 52 in piston 22. Cylindrical member 84 interiorly threaded at one end engages member 82 on the other side of member 66 from piston 22. Member 84 thus forms a cylindrical cavity connecting with bore 52 in piston 22. Member 84 is exteriorly threaded to accommodate two lock nuts 86 and 88 whose function will be described subsequently. A small cylindrical bellows 90 open at either end is located within the cylindrical cavity formed by member 84. It is fastened in gas-tight relationship at one end with member 82 by such means as silver soldering. It is closed in gas-tight relationship at the other end by member 92 also by such means as silver soldering. Member 92 is in turn fixedly secured as by set screw or the like to the movable member 74. Thus when the actuating bellows 76 is subjected to air pressure causing member 74 to move toward member 66, member 92 flexes the bellows 90 in a compression direction to reduce the volume thereof. It may readily be seen that this reduction in volume caused by the movement will cause a given volume of fluid within the chamber formed by the bellows to be forced out of the overall sampling chamber system formed by bores 50 and 52 in the piston 22, the passage through the member 82 and the interior of bellows 90 determined by the travel of member 92. Nuts 88 and 86 threaded on the exterior of cylindrical member 84 are adapted to adjustably limit the movement of member 92 when actuating means 76 is energized. Shoulder 87 on nut 86 engages shoulder 93 on member 92 to limit the travel of members 92 and 74. The nut 88 serves to lock the positioning nut 86 in a desired location. It is thus possible to vary the volume of a sample within the sampling chamber system which will be forced out of said system upon energization of the injecting means 76.

It has further been found that for best sampling results the sampling system should be substantially filled with fresh sample each time the apparatus is in the sampling position. To accomplish this a passage 94 is provided in member 92 which is connected to a vent through a suitable conduit means 96 and a valve means 98 which can be selectively opened and closed as by a solenoid. When the piston 22 is in the sampling position the valve 98 is opened allowing substantial purging of the sampling chamber system by fresh sample fluid.

The operation of the apparatus is preferably controlled by microswitches located adjacent cams on a motor driven camshaft. These cams are programmed to operate actuating means 24, 76 and the valve 98 according to the sequence set forth below.

Assuming the piston 22 to be in the sampling position exemplified by FIG. 2 the valve 98 is open and the injecting means 76 is deenergized whereby springs 78 force member 74 to its retracted position. At this time sample fluid flows through opening 50 in piston 22, through bore 52, into the chamber formed by bellows 90, through passage 94 in member 92, through the conduit 96 and valve 98 and out the vent. Next the valve 98 is closed, then the transport actuating means 24 is energized causing the piston 22 and the entire injecting assemblage represented by the numeral 60 to be transported to the position whereby the opening 50 is lined up with outlet 30 in the carrier gas line. At this point injecting means 76 is energized causing a reduction in volume of the sampling system due to compression of bellows 90 as set forth above injecting a volume of the sample fluid to be injected into the carrier conduit. With the means 76 still energized transport means 24 is returned to the original sampling position at which time injection means 76 is deenergized causing the bellows to return to its original position and the valve 98 is again opened.

By means of the above system very accurate and reproducible volumes of sample may be injected into the analyzing system and by simply changing the travel of member 92 through adjusting the position of nut 86 the volume of sample injected may be varied from zero as one limit to a volume which is limited only by the size and compressibility of the bellows 90 as the other limit.

It is obvious that many variations can be made in the specific preferred embodiment disclosed herein without departing from the spirit and scope of the invention. For example the actuating means could be solenoid actuators rather than the pneumatic means disclosed. Also a piston and cylinder arrangement could be used rather than the bellows disclosed, however, the bellows is superior from a leakage standpoint especially where high sample pressures are encountered. The guide rails and slides could also be designed somewhat differently by a person skilled in the art. Also the stop means for the movable injecting assemblage characterized by members 74 and 92 could be located in numerous places on the fixed portion of the injection apparatus 60.

While the invention could be used with any fluid sampling system, it is especially well adapted for taking liquid samples where small variations in the liquid volume cause great variation in resulting gaseous volume when the liquid is vaporized in the separating column. When liquid samples are being analyzed a capillary tube is usually used between the injection apparatus and the separating column. Thus when the volume of liquid is injected into the said capillary tube and the piston returned to the sampling position, the carrier gas again flows through passage 34 in the piston and forces the liquid into the separating column where it is vaporized due to heat and/or pressure drop.

The extreme accuracy of the instant sampling apparatus is thought to be due in large part to the substantial freedom from leakage of sample due to the physical transportation of the sample and subsequent injection thereof. The freedom from contamination of the sample by the air or previous sample also contributes largely to this accuracy. The term physically transporting as used in the specification and claims is intended to mean the filling of a chamber in one flow stream and physically moving the chamber to another flow stream where it is at least partially emptied as opposed to filling a sample chamber from one flow stream and then flushing out with material from another flow stream by means of valves and conduits as done in the prior art.

What is claimed is:

1. In a vapor phase chromatographic analyzer which includes sampling means interposed between a carrier gas passage means and a multi-component fluid sample passage means for transporting a precise volume of a sample fluid from the latter passage means to the former passage means for injection of said volume of sample fluid into a carrier gas stream, the improvement which comprises means for injecting all or a selected amount of said precise volume of sample fluid into the carrier gas stream, which last named means comprises a variable volume chamber containing said precise volume of sample fluid at a first volume setting and means for reducing said volume by a predetermined amount when it is desired to inject sample fluid into the carrier gas stream, the amount of volume reduction equaling the volume of sample fluid injected into the carrier gas stream.

2. The vapor phase chromatographic analyzer as set forth in claim 1 wherein the variable volume chamber comprises a flexible bellows with a movable member fixedly attached thereto at one end and adapted to compress said bellows thereby reducing the volume thereof.

3. A vapor phase chromatographic gas analyzer as set forth in claim 2 wherein the means provided for selecting the amounts of volume reduction comprises a set screw which serves as a stop member for the movable member fixedly attached to one end of the bellows.

4. A fluid transporting and injection device for use in a vapor phase chromatographic analyzer comprising, in combination, a body member having a bore therein, a first passage intersecting said bore in said body member for a carrier gas and a second passage intersecting said bore in said body member for a sample fluid; a piston slidably mounted within said bore at least twice as long as the distance between respective points of intersection of the first and the second passages with said bore, said piston having a passageway therethrough located to be substantially aligned with the intersection of the first passage and the bore when an opening in the piston wall is substantially aligned with the intersection of the second passage and the bore; means for connecting said opening in the piston wall to a variable volume chamber means comprising a substantially longitudinally disposed bore extending through said piston from a point of intersection with the opening in the piston wall to said variable volume chamber means; venting means connected to said variable volume chamber means, said venting means being adapted to be opened selectively when the opening in the piston wall lies in substantial alignment with the intersection of the second passage and the bore in the body member, whereby sample fluid will flow into and through the variable volume chamber means; transport means connected to said piston for concurrently moving the piston and the variable volume chamber means from a first position wherein the opening in the piston wall lies in substantial alignment with the intersection of the second passage and the bore to a second position wherein said opening lies in substantial alignment with the intersection of the first passage and the bore and for subsequently moving the piston from said second position to said first position; and means for reducing the volume of said variable volume chamber means to a selectable extent while said piston is in said second position to inject a preselected quantity of sample fluid into the carrier gas.

5. A fluid metering device as set forth in claim 4 wherein the variable volume chamber means is fixedly attached to and adapted to move with the slidably mounted piston, said variable chamber comprising a bellows, one end of which is attached to an actuating means which flexes said bellows to vary the volume thereof at a predetermined time.

6. A fluid sampling apparatus for introducing a precise volume of a sample fluid from a first fluid stream into a second fluid stream comprising, in combination, a body member having a bore therein and first and second passages intersecting said bore for carrying respectively the first and second fluid streams; a piston slidably mounted in said bore having an opening in a wall thereof connecting with a variable volume chamber and a diametrical hole therethrough located to lie under the intersection of the second passage and the bore when the opening in the piston wall lies under the intersection of the first passage and the bore; first actuating means for selectively moving said piston between a first position wherein the opening in the wall thereof lies under the intersection of the first passage and the bore and a second position wherein said opening lies under the intersection of the second passage and the bore; and venting means connected to said variable volume chamber, said venting means being adapted to be opened selectively when the opening in the piston wall lies in substantial alignment with the intersection of the first passage and the bore in the body member, whereby sample fluid will flow into and through the variable volume chamber.

7. A sampling apparatus as set forth in claim 6 wherein the variable volume chamber is connected to the opening in the piston wall by means of an axial bore extending longitudinally within the piston and wherein the venting means, the variable volume chamber, a second actuating means for varying the volume of the variable chamber, an adjustable stop means associated with said second actuating means for determining an amount of volume change in the variable volume chamber and the piston are comprised in an assembly and slidably mounted for movement together by the first actuating means.

8. A fluid sampling apparatus as set forth in claim 7 wherein the first and second actuating means are pneumatically operated and wherein the variable volume chamber is a bellows, one end of which is attached to the second actuating means.

9. A fluid sampling apparatus as set forth in claim 7 wherein means is provided in the body member around the periphery of the bore therein for maintaining flow of the first fluid stream around the piston regardless of the position of the opening in the piston wall, said means comprising an annular groove in the wall of the bore in the body member located at the intersection of the first passage and said bore.

References Cited in the file of this patent
UNITED STATES PATENTS

| | | |
|---|---|---|
| 1,837,858 | Grace | Dec. 22, 1931 |
| 2,757,541 | Watson et al. | Aug. 7, 1956 |
| 2,826,908 | Skarstrom | Mar. 18, 1958 |
| 2,830,738 | Sorg et al. | Apr. 15, 1958 |
| 2,846,121 | Ronnebeck | Aug. 5, 1958 |
| 2,872,817 | Pitts | Feb. 10, 1959 |
| 2,899,258 | Spracklen | Aug. 11, 1959 |

OTHER REFERENCES

Gas Chromatography, by A. I. M. Keulemans, December 1957, pages 66 and 67.